(12) United States Patent
Chen et al.

(10) Patent No.: US 6,721,183 B1
(45) Date of Patent: Apr. 13, 2004

(54) COMPUTER ENCLOSURE INCORPORATING HOOD FASTENER

(75) Inventors: Jung-Chi Chen, Tu-chen (TW); Zhou Xu, Shenzhen (CN); Ler Han, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/340,172

(22) Filed: Jan. 10, 2003

(30) Foreign Application Priority Data

Nov. 27, 2002 (TW) .......................................... 91219116

(51) Int. Cl.⁷ ................................................ G06F 1/16

(52) U.S. Cl. .......................... 361/726; 29/278; 16/404; 217/215; 312/223.2

(58) Field of Search ................................ 361/724–727, 361/680–687; 29/278; 16/404, DIG. 12, DIG. 16; 174/46; 217/215; 30/260; 312/223.1–223.6

(56) References Cited

U.S. PATENT DOCUMENTS

| 5,600,538 A | * | 2/1997 | Xanthopoulos | ............. 361/683 |
| 6,590,765 B2 | * | 7/2003 | Crowley | ..................... 361/683 |
| 2003/0193782 A1 | * | 10/2003 | Chen | .......................... 361/726 |

* cited by examiner

Primary Examiner—Hung Van Duong
(74) Attorney, Agent, or Firm—Wei Te Chung (57) ABSTRACT

A computer enclosure includes a chassis (30), a hood (10) and a fastener (20) securing the hood to the chassis. The chassis includes a rear panel (33) forming an L-shaped tab thereon, and a pair of side panels each defining a plurality of splits (37). The hood includes a recessed portion (12) and a plurality of hooks (17) engaging with the splits. The fastener includes a handle (22) pivotably attached to the recessed portion, a latch (24) pivotably attached to the handle and engaging with the tab of the chassis, and a spring urging the latch to engage with the tab. When the handle is pivoted from a locked position to an unlocked position the latch is disengaged from the tab and is removed away from the rear panel to cause the handle to move the hood thereby releasing the hooks from the splits.

20 Claims, 7 Drawing Sheets

COMPUTER ENCLOSURE INCORPORATING HOOD FASTENER

BACKGROUND OF THE INVENTION

1. Field of the Invention

The present invention relates to computer enclosures, and particularly to a computer enclosure having a hood readily attached thereto and detached therefrom by means of a fastener.

2. Related Art

A conventional personal computer enclosure generally includes a chassis, a hood and a bezel. The chassis is used to hold components such as motherboards, interface cards, a power supply and disk drives. The chassis is generally U-shaped, and comprises a base, a front panel and a rear panel. The hood is also U-shaped, and has a top panel and two opposite side panels depending from the top panel. The hood is slidably attached to the chassis along rails formed on opposite sides of the chassis, and then secured to the rear panel with screws. Finally, the bezel is mounted on the front panel.

Securing the hood to the rear panel with screws is unduly complicated and time-consuming. Furthermore, it is difficult to simultaneously align both side edges of the hood with the respective rails of the chassis.

Another kind of conventional hood is secured to chassis by means of engagement of locking catches of the hood with slots of the chassis. However, disengaging this kind of hood from the chassis is complicated and laborious.

SUMMARY OF THE INVENTION

Accordingly, an object of the present invention is to provide a computer enclosure which has a fastener for readily mounting a hood to the enclosure and readily removing the hood therefrom.

To achieve the above-mentioned object, a computer enclosure in accordance with the present invention comprises a chassis, a hood and a fastener securing the hood to the chassis. The chassis comprises a rear panel, and a pair of side panels defining a plurality of splits therein. An abutting wall is formed inwardly from the rear panel. An L-shaped tab extends inwardly from the abutting wall. The hood comprises a recessed portion. The fastener includes a handle pivotably attached to the recessed portion, a latch pivotably attached to the handle and engaging with the tab of the chassis, and a spring urging the latch to engage with the tab. When the handle is pivoted from a locked position to an unlocked position the latch is disengaged from the tab and is removed away from the rear panel to cause the handle to move the hood relative to the chassis thereby releasing the hooks of the hood from the splits of the chassis.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
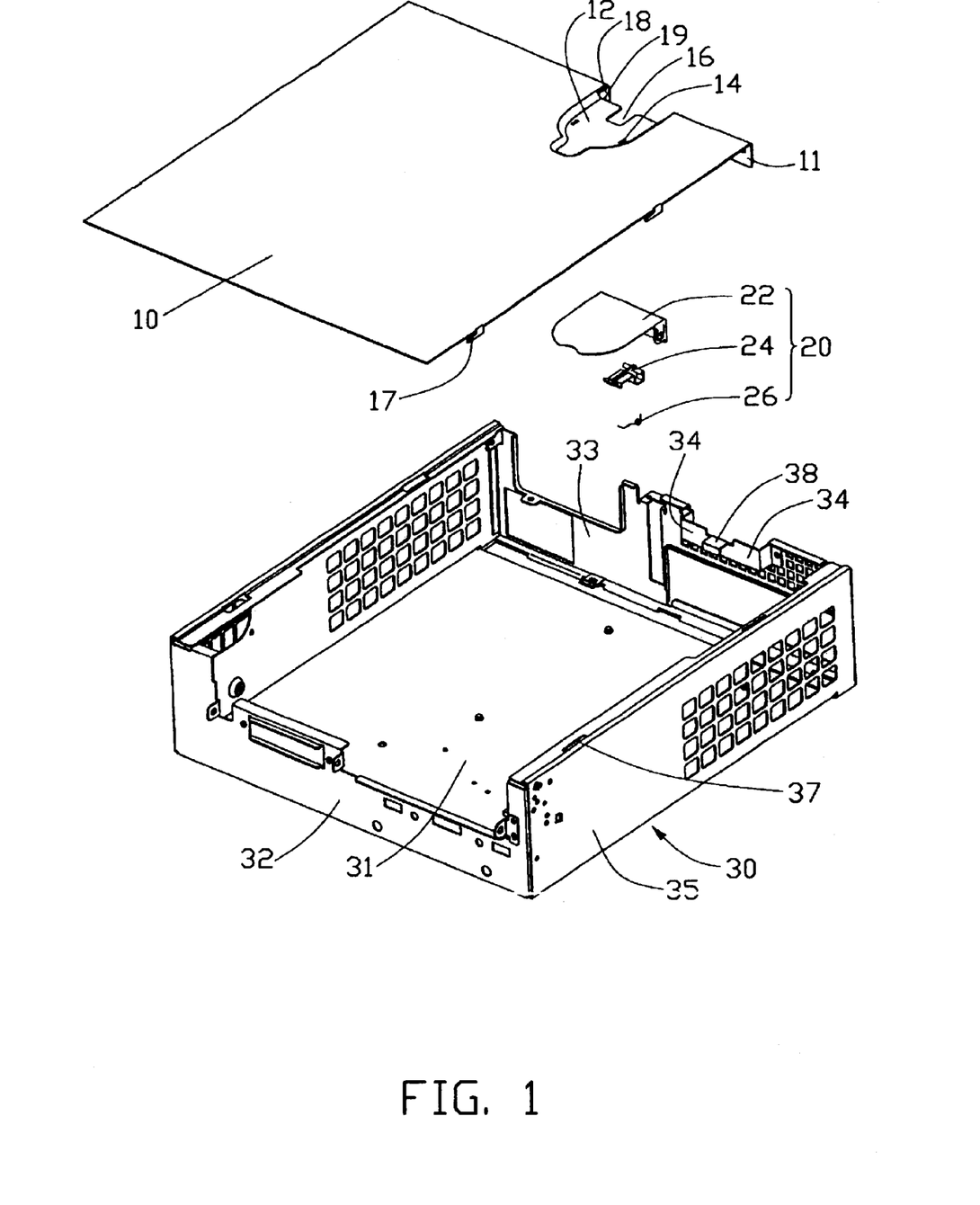
FIG. 1 is an exploded, isometric view of a computer enclosure in accordance with the present invention; the computer enclosure comprising a hood, a chassis and a fastener, the fastener comprising a handle, a latch and a spring.

Referring to FIG. 1, a computer enclosure in accordance with the present invention comprises a hood 10, a chassis 30 and a fastener 20 attaching the hood 10 to the chassis 30. The fastener 20 comprises a handle 22, a latch 24 and a spring 26.

The hood 10 is stamped downward to form a U-shaped recessed portion 12 in a rear portion thereof. A pair of locking holes 14 is defined in opposite sides of the recessed portion 12 respectively. A cutout 16 is defined in a rear edge of the recessed portion 12. A pair of bent plates 11 depends from a rear edge of the hood 10, at opposite sides of the recessed portion 12 respectively. A bent tab 18 is bent forwardly from an end of the bent plate 11 that is adjacent the recessed portion 12. A pivot hole 19 is defined in the bent tab 18. A pair of hooks 17 is formed downwardly from each of opposite side edges of the hood 10.

The chassis 30 comprises a bottom wall 31, a front wall 32, a rear wall 33, and a pair of sidewalls 35. A recessed abutting wall 34 is formed inwardly from the rear wall 33, corresponding to the recessed portion 12 of the hood 10. An L-shaped tab 38 extends inwardly from a top edge of the abutting wall 34. A pairs of splits 37 is defined in a top flange of each sidewall 35.

Figure 2:
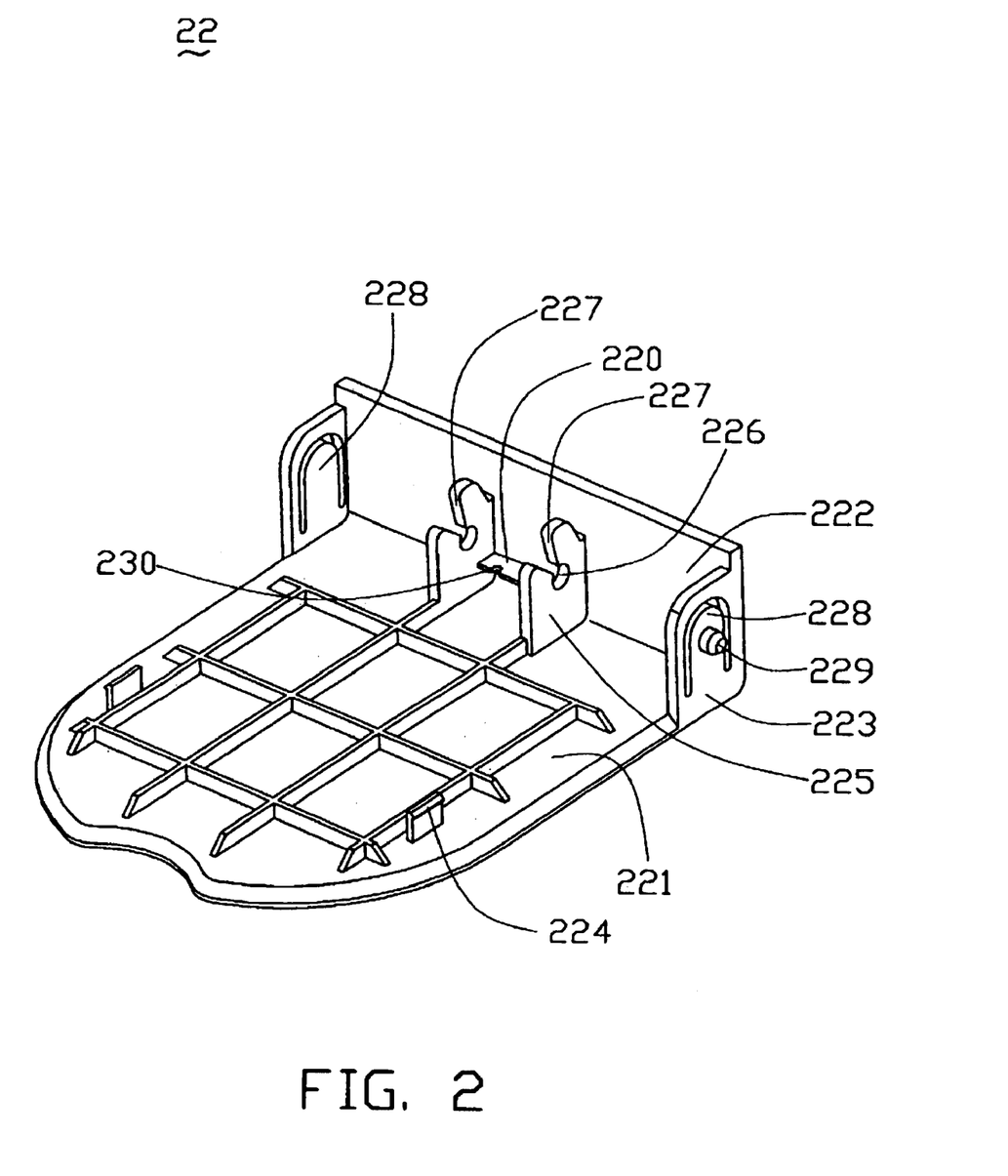
FIG. 2 is an enlarged, isometric view of the handle of FIG. 1, but showing the handle inverted.

Referring to FIG. 2, the handle 22 comprises a generally arch-shaped base 221, a rear plate 222 extending perpendicularly from a rear edge of the base 221, and a pair of side plates 223 extending perpendicularly from rearmost portions of opposite side edges of the base 221. A pair of catches 224 is formed on the base 221, for engaging in the locking holes 14 of the hood 10. A pair of pivot plates 225 is perpendicularly formed between the base 221 and the rear plate 222 at a junction thereof. A pair of coaxial pivot apertures 226 is defined in the pivot plates 225. A pair of guide entrances 227 is defined in the pivot plates 225 respectively in communication with the corresponding pivot apertures 226. A rib 220 connects between the pivot plates 225. A notch 230 is defined in a free edge of the rib 220. Each side plate 223 forms an elastic tongue 228 therein. A pair of coaxial pins 229 is respectively outwardly formed from the tongues 228, corresponding to the pivot holes 19 of the hood 10. A pivot axis defined by the pins 229 is offset from a pivot axis defined by the pivot apertures 226.

Figure 3:
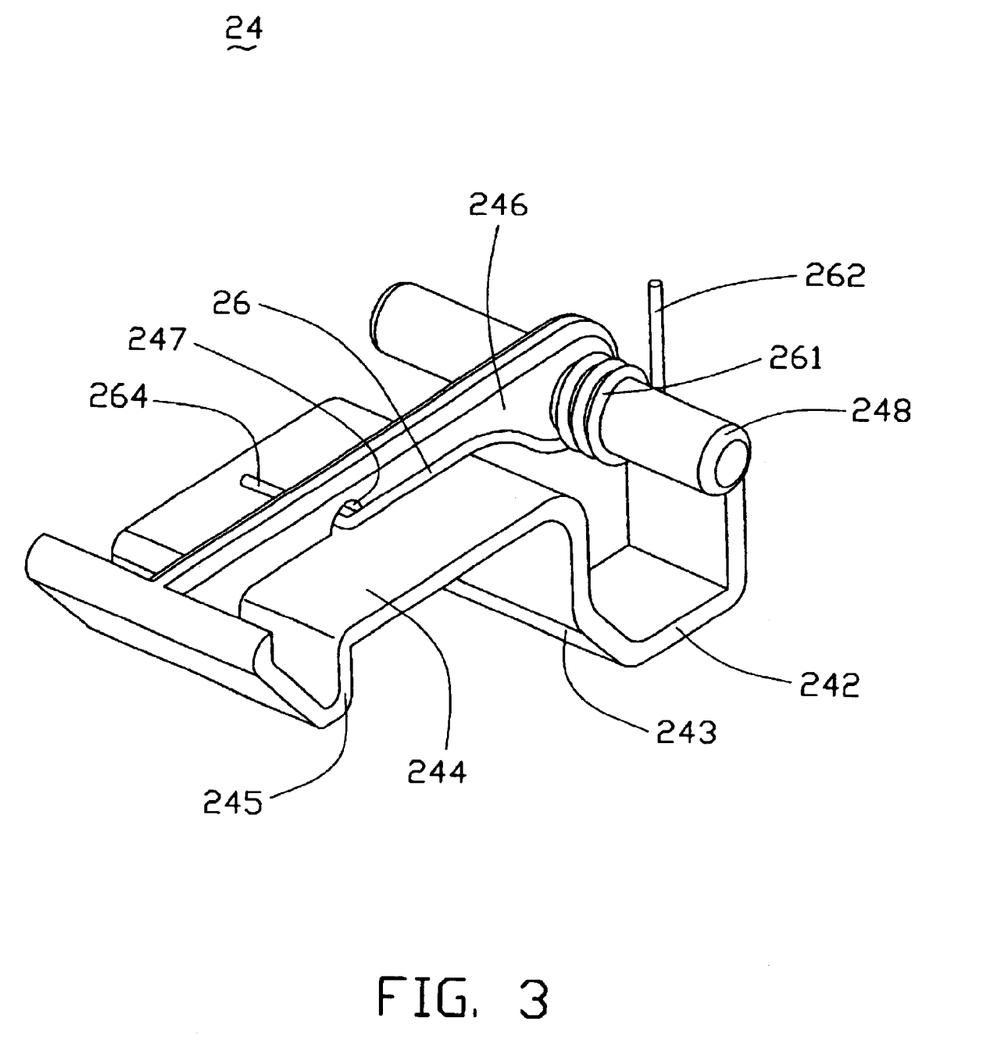
FIG. 3 is an enlarged, assembled view of the latch and the spring of FIG. 1.

Referring to FIG. 3, the latch 24 comprises an abutting portion 242 having a U-shaped profile, and a rectangular extension portion 244 extending horizontally inwardly from a top edge of the abutting portion 242. A slanted abutting surface 243 is defined on the abutting portion 242, for abutting the abutting wall 34 of the chassis 30. A clasp 245 having a V-shaped profile is formed at a distal end of the extension portion 244. A longitudinal ridge 246 is formed on a middle of the latch 24, spanning from the abutting portion 242 through the extension portion 244 to a distal end of the clasp 245. A through opening 247 is defined in the ridge 246 where it joins the extension portion 244. A pair of coaxial pivots 248 extends perpendicularly from respective opposite sides of the ridge 246 above the abutting portion 242. The spring 26 comprises a coil 261, and first and second free ends 262, 264 that are perpendicular to each other.

Figure 4:
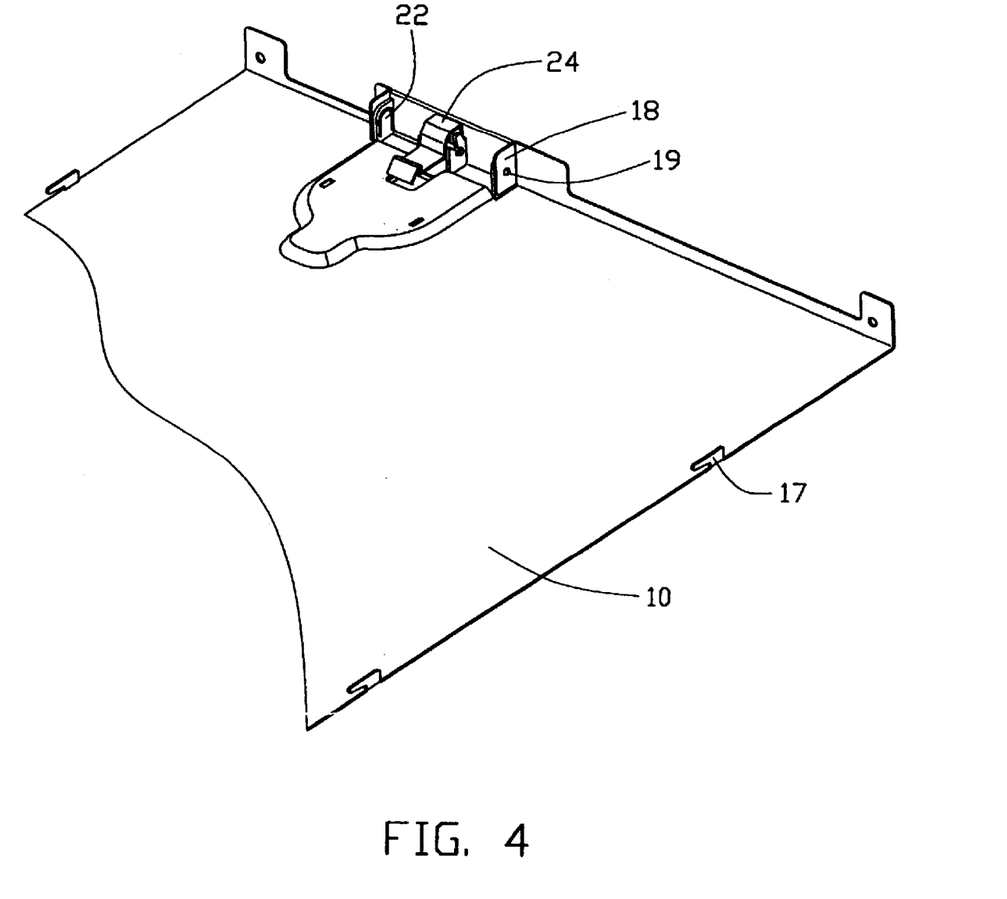
FIG. 4 is an assembled view of the handle, the latch, the spring and the hood of FIG. 1, but showing all of these parts inverted, and only a portion of the hood.
Figure 5:
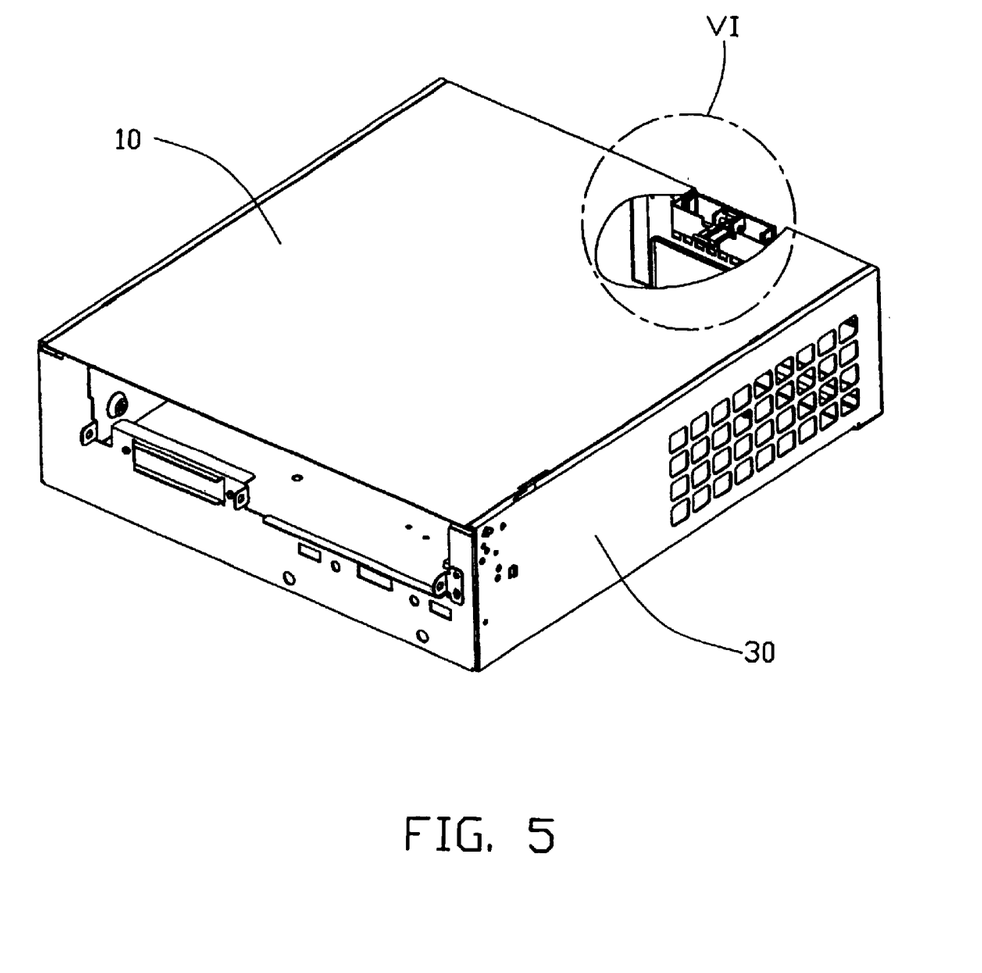
FIG. 5 is an assembled view of FIG. 1, with portions of the handle and the hood cut away.
Figure 6:
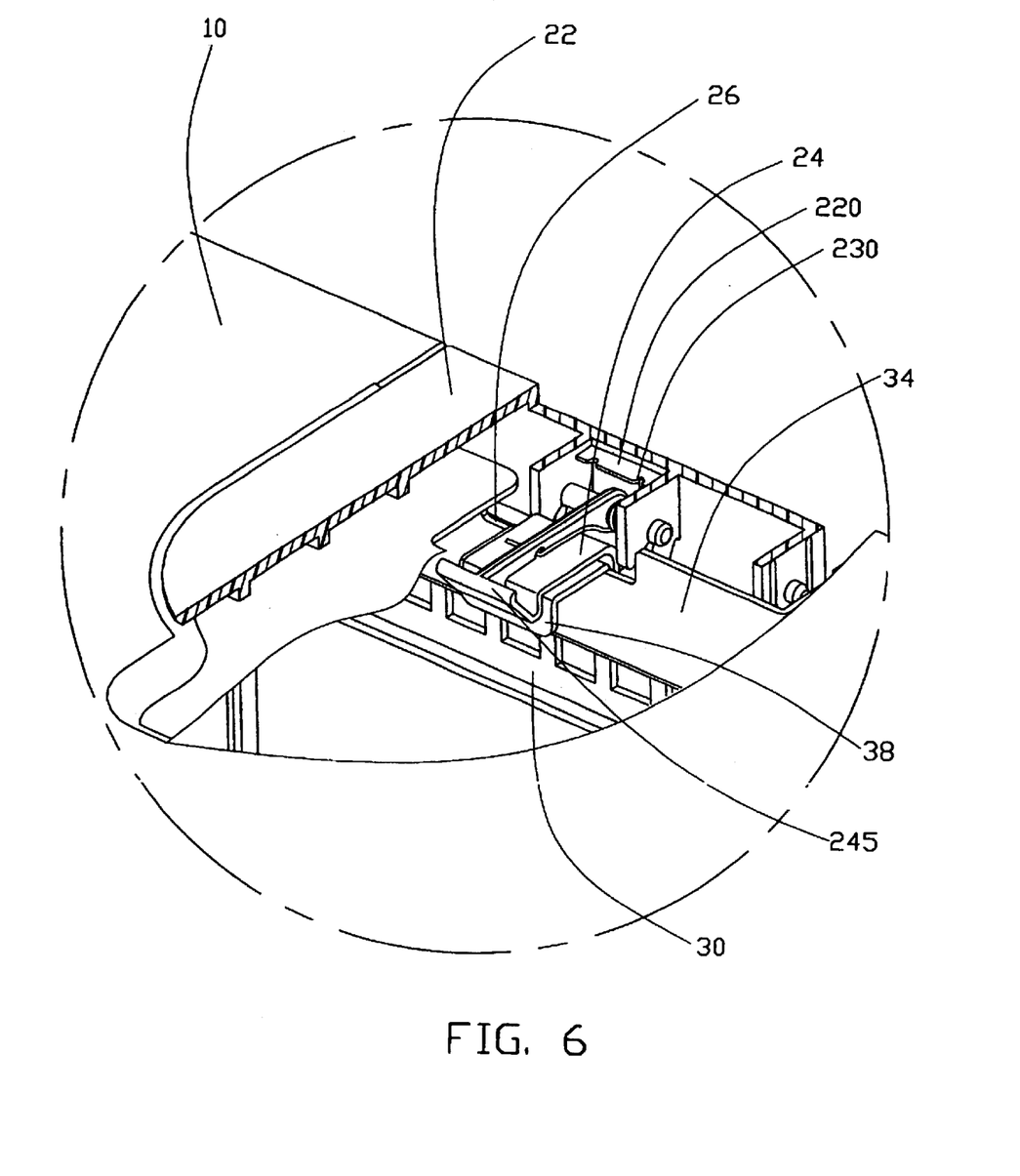
FIG. 6 is an enlarged view of an encircled portion VI of FIG. 5.

Referring to FIGS. 4–6, in assembly, the spring 26 is attached to the latch 24. The coil 261 surrounds one of the pivots 248. The first end 262 is oriented vertically upwardly. The second end 264 is extended through the through opening 247 of the latch 24 and horizontally abuts the extension portion 244. The combined latch 24 and spring 26 is attached to the handle 22. The pivots 248 are received in the pivot apertures 226 via the guide entrances 227, respectively. The first end 262 is retained in the notch 230 of the handle 22. The combined handle 22, latch 24 and spring 26 is then attached to the hood 10. The pins 229 of the handle 22 are received in the pivot holes 19 of the hood 10, respectively. The handle 22 is supported on the recessed portion 12 and the catches 224 of the handle 22 are engaged in the locking holes 14 of the hood 10.

The combined hood 10, handle 22, latch 24 and spring 26 is attached to the chassis 30. The hooks 17 of the hood 10 are engaged in the splits 37 of the chassis 30. The second end 264 of the spring 26 abuts against the extension portion 244 of the latch 24 to cause the clasp 245 to snappingly engage with the tab 38 of the chassis 30, thereby preventing the hood 10 from moving backward. Thus, the hood 10 is securely attached to the chassis 30.

Figure 7:
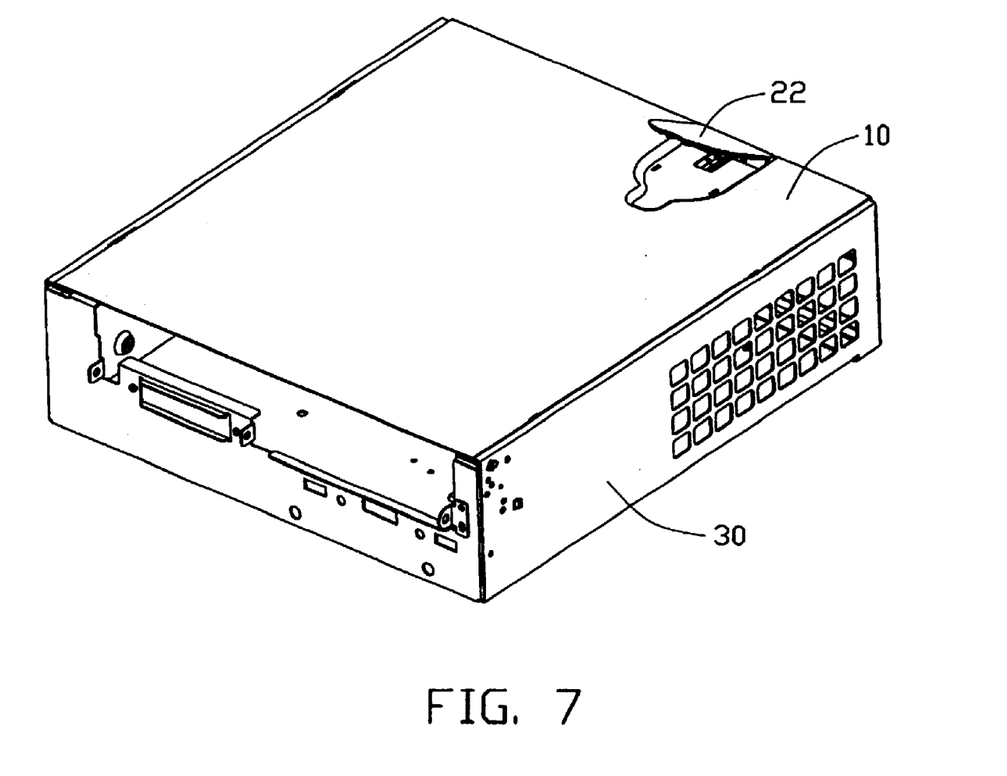
FIG. 7 is an assembled view of FIG. 1, showing the handle in a released position.

Referring to FIG. 7, in removing the hood 10, a free edge of the handle 22 opposite from the rear plate 222 is pulled upwardly. The catches 224 of the handle 22 are disengaged from the locking holes 14 of the hood 10. The handle 22 is pulled further upwardly, with the latch 24 pivoting upwardly about the pivots 248 thereof and into the cutout 16 of the hood 10. The clasp 245 is released from the tab 38 of the chassis 30. The abutting surface 243 slidingly abuts against an outside of the abutting wall 34 of the chassis 30. The combined latch 24, handle 22 and hood 10 is accordingly forced backward as the handle 22C is continued to be pivoted upwardly. The hooks 17 are released from the splits 37 of the chassis 30. The hood 10 is then readily to be removed from the chassis 30.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
    a chassis comprising a rear panel having a locking means formed thereon, and a pair of side panels comprising a first engaging means;
    a hood detachably secured on the chassis, the hood comprising a second engaging means engaging with the first engaging means, and
    a fastener comprising a handle pivotably attached to the hood, a latch connecting to the handle and engaging with the locking means of the chassis, wherein when the handle is pivoted from a locked position to an unlocked position, the latch disengages from the locking means and is moved away from the rear panel to cause the hood to be moved relative to the chassis thereby releasing the second engaging means from the first engaging means.

2. The computer enclosure as claimed in claim 1, wherein the first engaging means comprises a plurality of hooks, and the second engaging means comprises a plurality of splits.

3. The computer enclosure as claimed in claim 1, wherein the hood comprises a recessed portion in which the handle is received.

4. The computer enclosure as claimed in claim 3, wherein the recessed portion defines at least one locking slot, and the handle comprises at least one catch engaging in the at least one locking slot.

5. The computer enclosure as claimed in claim 3, wherein the handle comprises a body, a rear plate extending perpendicularly from a rear edge of the body, and a pair of side plates extending perpendicularly from opposite side edges of the body.

6. The computer enclosure as claimed in claim 5, wherein each of the side plates comprises a spring tongue and a pin outwardly formed from the spring tongue.

7. The computer enclosure as claimed in claim 6, wherein the hood comprises a pair of bent plates depending from a rear edge thereof on opposite sides of the recessed portion, a bent tab is bent forwardly from an end of each bent plate adjacent the recessed portion, a pivot hole is defined in the bent tab, and the pins are pivotably received in the pivot holes, respectively.

8. The computer enclosure as claimed in claim 6, wherein the handle further comprises a pair of pivot plates formed at a junction of the body and the rear plate, the pivot plates define a pair of coaxial pivot apertures, the latch comprises a pair of coaxial pivots pivotably received in the pivot apertures respectively, and an axis of the pivot apertures is offset from an axis of the pins.

9. The computer enclosure as claimed in claim 8, wherein a rib is connected between the pair of pivot plates, a notch is defined in the rib, a spring surrounds one of the pivots, and one end of the spring is received in the notch.

10. The computer enclosure as claimed in claim 9, wherein the latch comprises an abutting portion, an extension portion extending from an end of the abutting portion, and a clasp formed on a distal end of the extension portion, the clasp engaging with the locking means of the chassis when the handle is in the locked position.

11. The computer enclosure as claimed in claim 10, wherein a ridge is formed on the latch spanning from the abutting portion through the extension portion to a distal end of the clasp, the ridge defines a though opening where it adjoins the extension portion, an opposite end of the spring is received in the through opening, and the pivots extend from opposite sides of the ridge.

12. The computer enclosure as claimed in claim 10, wherein the clasp has a V-shaped profile.

13. The computer enclosure as claimed in claim 10, wherein the abutting portion comprises a slanted abutting surface slidingly abutting against the locking means when the handle is pivoted from the locked position to the unlocked position.

14. The computer enclosure as claimed in claim 13, wherein the locking means comprises an abutting wall formed inwardly from the rear panel, and an L-shaped tab extending inwardly from the abutting wall.

15. A computer enclosure comprising:
    a chassis comprising a panel having a blocking means;
    a hood slidingly mounted to the chassis along a first direction perpendicular to the panel to be in a locked position and slidingly detachable from the chassis along a second direction opposite to the first direction to be in an unlocked position; and a fastener comprising a handle pivotably attached to the hood, and a latch comprising an abutting portion, wherein the latch is movable upon operation of the handle between a holding position in which the latch engages with the blocking means and locks the hood in the locked position and a released position in which the latch is released from the blocking means and the abutting portion abuts against the panel to cause the hood to slide to the unlocked position.

16. The computer enclosure as claimed in claim 15, wherein the fastener further comprises an elastic member attached on the latch to urge the latch to engage with the blocking means in the holding position.

17. The computer enclosure as claimed in claim 15, wherein the blocking means comprises a tab formed inwardly from the panel, and the latch further comprises a clasp formed at a free end thereof and engaged with the tab in the holding position.

18. The computer enclosure as claimed in claim 15, wherein the hood is moved a distance in the first direction when the hood is moved to the unlocked position from the locked position.

19. A computer enclosure comprising:

a chassis defining lengthwise, lateral and vertical axis perpendicular to one another;

a locking device formed on the chassis;

a hood being attachable to the chassis; and a fastener including a handle pivotally, about a first pivot axle extending along said lateral axis, mounted to the hood, and a latch pivotally, about a second pivot axle extending along said lateral axis, mounted to the handle with a biasing device disposed therebetween; wherein in an assembling process, said hood is initially assembled to the chassis along the vertical axis to a release position and successively along the lengthwise axis to a locking position under a condition that the handle is rotatably depressed to urge the latch to be engaged with the locking device;

oppositely, when said hood is in said locking position and in a disassembling process, by reverse rotation of the handle the latch is disengaged from the locking device, and by engagement between the handle and the chassis during said reverse rotation the hood is forcibly moved relative to the chassis along said lengthwise axis to said release position for further movement along the vertical axis.

20. The enclosure as claimed in claim 19, wherein said first axle and said second axles are aligned with each other along said lateral axis.

* * * * *